United States Patent
Bienas et al.

(10) Patent No.: US 8,913,591 B2
(45) Date of Patent: Dec. 16, 2014

(54) MOBILE COMMUNICATION DEVICE AND METHOD FOR PERFORMING RADIO LINK PERFORMANCE MEASUREMENTS

(75) Inventors: Maik Bienas, Braunschweig (DE); Andreas Schmidt, Braunschweig (DE)

(73) Assignee: Intel Mobile Communications GmbH, Neubiberg (DE)

(*) Notice: Subject to any disclaimer, the term of this patent is extended or adjusted under 35 U.S.C. 154(b) by 118 days.

(21) Appl. No.: 13/017,079

(22) Filed: Jan. 31, 2011

(65) Prior Publication Data

US 2012/0195290 A1    Aug. 2, 2012

(51) Int. Cl.
| | |
|---|---|
| *H04W 4/00* | (2009.01) |
| *H04W 24/10* | (2009.01) |
| *H04W 48/20* | (2009.01) |
| *H04W 64/00* | (2009.01) |
| *H04W 88/02* | (2009.01) |

(52) U.S. Cl.
CPC .............. *H04W 24/10* (2013.01); *H04W 48/20* (2013.01); *H04W 64/006* (2013.01); *H04W 88/02* (2013.01)
USPC .......................................... 370/332; 370/331

(58) Field of Classification Search
None
See application file for complete search history.

(56) References Cited

U.S. PATENT DOCUMENTS

| | | | |
|---|---|---|---|
| 6,327,469 B1 | 12/2001 | Gaastra | |
| 6,487,411 B1* | 11/2002 | Laakso et al. | 455/437 |
| 2004/0203882 A1 | 10/2004 | Laiho et al. | |
| 2006/0172759 A1* | 8/2006 | Ishihara | 455/525 |
| 2008/0004023 A1* | 1/2008 | Chen et al. | 455/436 |
| 2009/0168906 A1 | 7/2009 | Hagerman et al. | |
| 2010/0124924 A1* | 5/2010 | Cheng et al. | 455/434 |
| 2010/0177758 A1 | 7/2010 | Aqvist et al. | |

FOREIGN PATENT DOCUMENTS

| | | |
|---|---|---|
| CN | 1336090 A | 2/2002 |
| CN | 1753554 A | 3/2006 |
| CN | 101646210 A | 2/2010 |
| CN | 101911767 A | 12/2012 |
| DE | 19959136 A1 | 6/2000 |
| DE | 60304733 T2 | 4/2007 |

(Continued)

OTHER PUBLICATIONS

3GPP TS 36.331 V9.3.0, Jun. 2010, 3rd Generation Partnership Project; Technical Specification Group Radio Access Network; Evolved Universal Terrestrial Radio Access (E-UTRA); Radio Resource Control (RRC); Protocol specification (Release 9), pp. 1-77.

(Continued)

*Primary Examiner* — Wing F Chan
*Assistant Examiner* — Padma Mundur
(74) *Attorney, Agent, or Firm* — Schwabe, Williamson & Wyatt, P.C.

(57) ABSTRACT

According to one embodiment, a mobile communication device is provided comprising a determiner configured to determine at least one of a geographical position of the mobile communication device within a first mobile radio cell in which the mobile communication device is located and a movement direction of the mobile communication device; a selector configured to select, based on at least one of the determined geographical position and the determined movement direction, from a plurality of second mobile radio cells at least one second mobile radio cell for a radio link performance measurement (RLPM); and a measuring circuit configured to measure the performance of a radio link between the mobile communication device and a base station operating the at least one selected second mobile radio cell.

21 Claims, 10 Drawing Sheets

(56) References Cited

FOREIGN PATENT DOCUMENTS

| | | | |
|---|---|---|---|
| GB | 2331892 A | 6/1999 | |
| GB | 2458447 B | 3/2010 | |
| WO | WO 2005/027556 A1 * | 3/2005 | ............... H04Q 7/38 |

OTHER PUBLICATIONS

3GGP TS 36.304 V9.3.0, Jun. 2010 3rd Generation Partnership Project; Technical Specification Group Radio Access Network; Evolved Universal Terrestrial Radio Access (E-UTRA); User Equipment (UE) procedures in idle mode (Release 9), pp. 1-32.

3GPP TS 36.300 V9.4.0, Jun. 2010 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9), pp. 1-137.

English language abstract of DE 603 04 733 T2.

Andreas Schmidt and Maik Bienas, "Neighbour Cell List Filtering", Invention Report: NCL Filtering, Aug. 11, 2010, pp. 1-13.

Chinese First Office Action and Search Report in Patent Application No. 20120021527.3, issued Mar. 4, 2014, including English translation 1-20, Chinese 21-29, for a total of 29 pages.

Chinese Patent Office; Second Office Action dated Sep. 16, 2014 for Chinese Patent App. No. 201210021527.3; 33 pages inclusive of English translation.

* cited by examiner

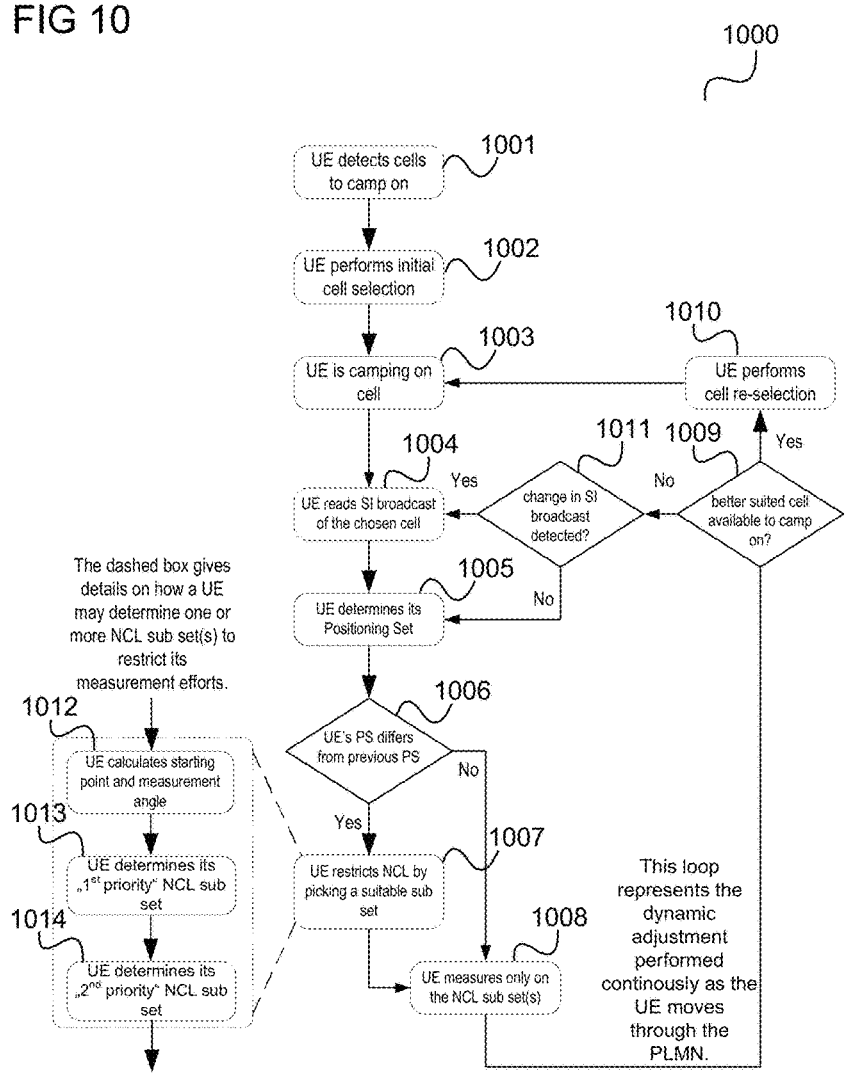

US 8,913,591 B2

MOBILE COMMUNICATION DEVICE AND METHOD FOR PERFORMING RADIO LINK PERFORMANCE MEASUREMENTS

TECHNICAL FIELD

Embodiments generally relate to a mobile communication device and a method for performing radio link performance measurements.

BACKGROUND

A cellular mobile communication system allows a user to roam with his mobile terminal, i.e. to move through the coverage area of the cellular mobile communication system while using communication connections provided by the communication system. For this, a mobile terminal is configured to be able to change the mobile radio cell on which it is camping, i.e. which it uses for communication connections to the network side of the communication system. Such a cell re-selection process is typically based on reception quality measurements of signals (e.g., reference signals) associated with the different mobile radio cells that might be used as the new mobile radio cell. Efficient methods to carry out such measurements for cell-reselection are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 10 shows a flow diagram according to an embodiment.

DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Figure 1:
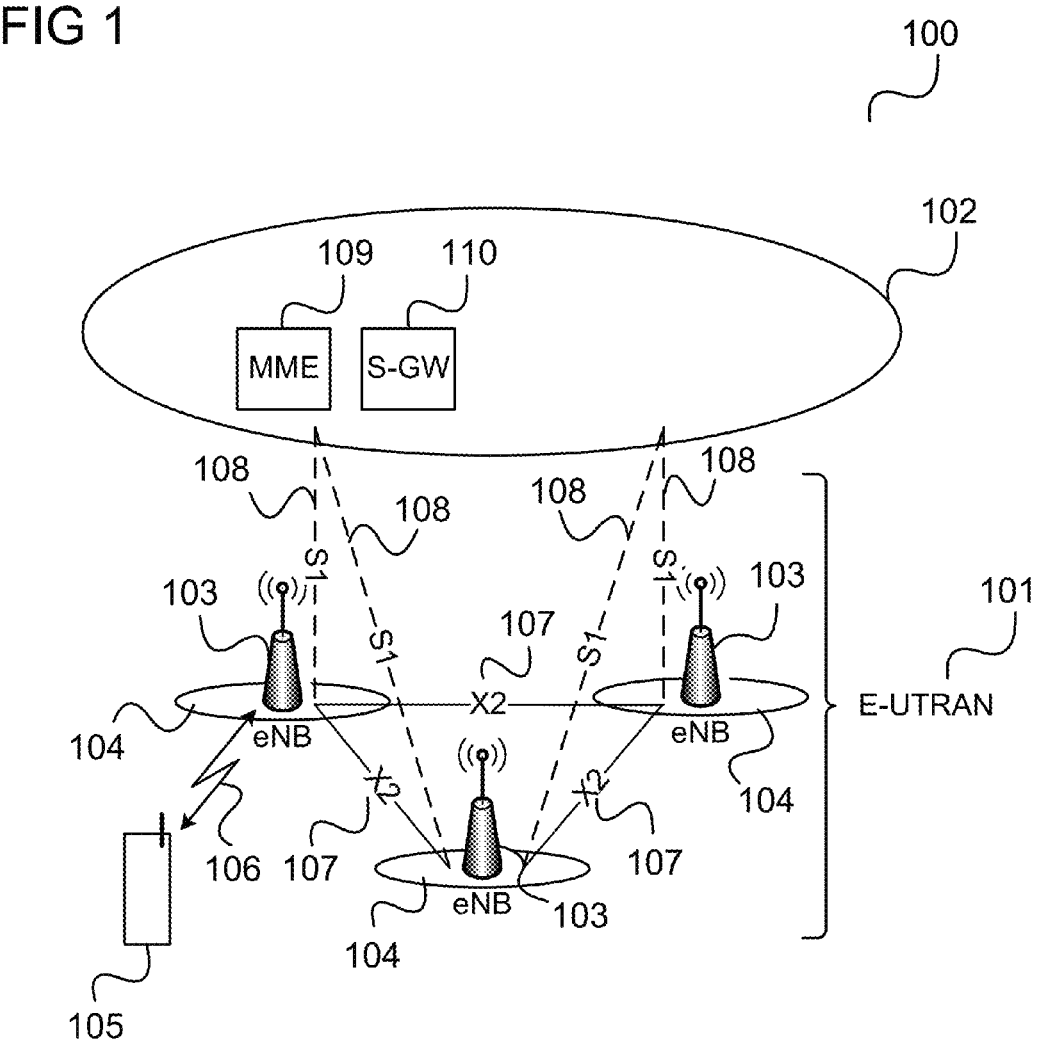
FIG. 1 shows a communication system according to an embodiment.

FIG. 1 shows a communication system 100 according to an embodiment.

The communication system 100 is a cellular mobile communication system including a radio access network (e.g. an E-UTRAN, Evolved UMTS (Universal Mobile Commmunications System) Terrestrial Radio Access Network according to LTE (Long Term Evolution)) 101 and a core network (e.g. an EPC, Evolved Packet Core, according LTE) 102. The radio access network 101 may include base (transceiver) stations (e.g. eNodeBs, eNBs, according to LTE) 103. Each base station 103 provides radio coverage for one or more mobile radio cells 104 of the radio access network 101.

A mobile terminal (also referred to as UE, user equipment) 105 located in a mobile radio cell 104 may communicate with the core network 102 and with other mobile terminals 105 via the base station providing coverage in (in other words operating) the mobile radio cell.

Control and user data are transmitted between a base station 103 and a mobile terminal 105 located in the mobile radio cell 104 operated by the base station 103 over the air interface 106 on the basis of a multiple access method.

The base stations 103 are interconnected with each other by means of a first interface 107, e.g. an X2 interface. The base stations 103 are also connected by means of a second interface 108, e.g. an S1 interface, to the core network, e.g. to an MME (Mobility Management Entity) 109, a Serving Gateway (S-GW) 110. For example, the MME 109 is responsible for controlling the mobility of mobile terminals located in the coverage area of E-UTRAN, while the S-GW 110 is responsible for handling the transmission of user data between mobile terminals 105 and core network 102.

In the following, it is assumed that the base stations 103 may support various radio access technologies. For example, a base station 103 may provide a radio communication connection via the air interface between itself and the mobile terminal 105 according to LTE, UMTS, GSM (Global System for Mobile Communications), and EDGE (Enhanced Data Rates for GSM Evolution) radio access. Accordingly, the radio access network may operate as an E-UTRAN, a UTRAN, or a GERAN (GSM EDGE Radio Access Network). Analogously, the core network 102 may include the functionality of an EPC, a UMTS core network or a GSM core network. Two base stations 103 that support communication according to different radio access technologies may accordingly be coupled with different core networks 102 and belong to different radio access networks 101. Further, the first interface 107 may for example not be present between two base stations 103 that support different radio access technologies.

The mobile terminal 105 may communicate with the radio access network 101 through the air interface (also referred to as radio interface) 106 via the base stations 103 while moving around. The radio interface 106 between the mobile terminal 105 and the radio access network 101 is thus implemented by providing the base stations 103 dispersed throughout the coverage area of the communication system 100 (e.g. a PLMN, public land mobile network).

Each base station of the communication system 100 controls communications within its geographic coverage area, namely its mobile radio cell 104 that is ideally represented by a hexagonal shape. When the mobile terminal 105 is located within a mobile radio cell 104 and camping on the mobile radio cell 104 (in other words is registered with the mobile radio cell 104) it communicates with the base station 103 controlling that mobile radio cell 104. When a call is initiated by the user of the mobile terminal 105 or a call is addressed to the mobile terminal 105, radio channels are set up between the mobile terminal 105 and the base station 103 controlling the mobile radio cell 104 in which the mobile station is located (and on which it is camping). If the mobile terminal 105 moves away from the original mobile radio cell 104 in which a call was set up and the signal strength on the radio channels established in the original mobile radio cell 104 weakens, the communication system may initiate a transfer of the call to radio channels of another mobile radio cell 104 into which the mobile terminal 105 moves.

As the mobile terminal 105 continues to move throughout the coverage area of the communication system 100, control of the call may be transferred between neighbouring mobile radio cells 104. The transfer of calls from mobile radio cell 104 to mobile radio cell 104 is termed handover (or handoff).

A handover may also occur between base stations 103 operating according to different radio access technologies. This is illustrated in FIG. 2.

Figure 2:
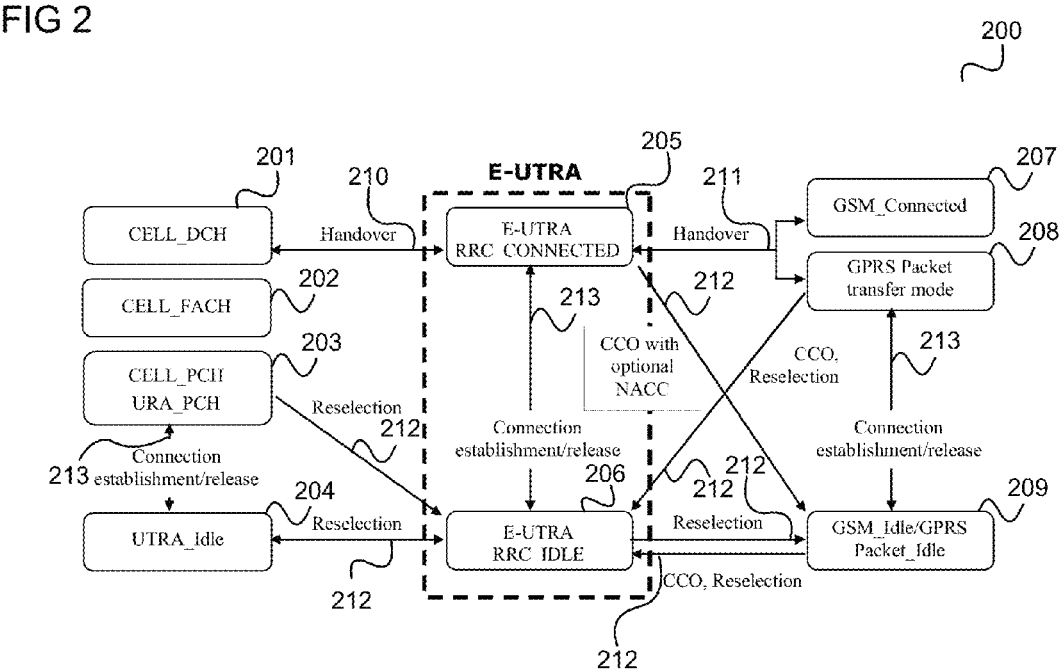
FIG. 2 shows a state diagram according to an embodiment.

FIG. 2 shows a state diagram 200 according to an embodiment.

The state diagram 200 includes the UMTS (UTRA, 3G) mobile terminal states CELL_DCH 201, CELL_FACH 202, CELL_PCH/URA_PCH 203, and UTRA_Idle 204, the LTE (E-UTRA) mobile terminal states RRC CONNECTED 205 and RRC IDLE 206 and the GSM (GERAN, 2G and 2.5G) mobile terminal states GSM Connected 207, GPRS Packet Transfer Mode 208, and GSM_Idle/GPRS Packet_Idle 209.

According to a first state transition 210, a handover may be carried out between E-UTRA (i.e. a base station 103 operating according to LTE) and UTRAN (i.e. a base station 103 operating according to UTMS).

According to a second state transition 211, a handover may be carried out between E-UTRA (i.e. a base station 103 operating according to LTE) and GERAN (i.e. a base station 103 operating according to GSM).

Third state transitions 212 may occur between states of the UTRAN, the GERAN, and the E-UTRAN, e.g. in case of cell reselection without the handover of an active call. It should be noted that state transitions between states of the UTRAN and GERAN are omitted for simplicity but may also be possible.

Fourth state transitions 213 may occur between states of the same radio access technology, e.g. when a call is released or a connection is established.

The two RRC (Radio Resource Control) states RRC Idle and RRC Connected in E-UTRA can be characterised as follows:
RRC IDLE
  Mobility is controlled by the mobile terminal 105.
  The mobile terminal 105
    may acquire system information (SI);
    monitors a paging channel to detect incoming calls and SI change;
    performs neighboring cell measurements for the cell (re-)selection process.
RRC CONNECTED
A mobile terminal 105 is in RRC_CONNECTED when an RRC connection has been established.
  Mobility is controlled by the radio access network 101 (handover and cell change order).
  The mobile terminal 105
    may acquire system information (SI);
    monitors a paging channel and/or SIB (system information block) Type 1 content to detect SI change;
    performs neighboring cell measurements and measurement reporting to assist the network in making handover decisions.

A base station 103 may send out information in broadcast mode such that it is the same for all mobile terminal 105 that are residing within the coverage area of the base station 103. This is illustrated in FIG. 3.

Figure 3:
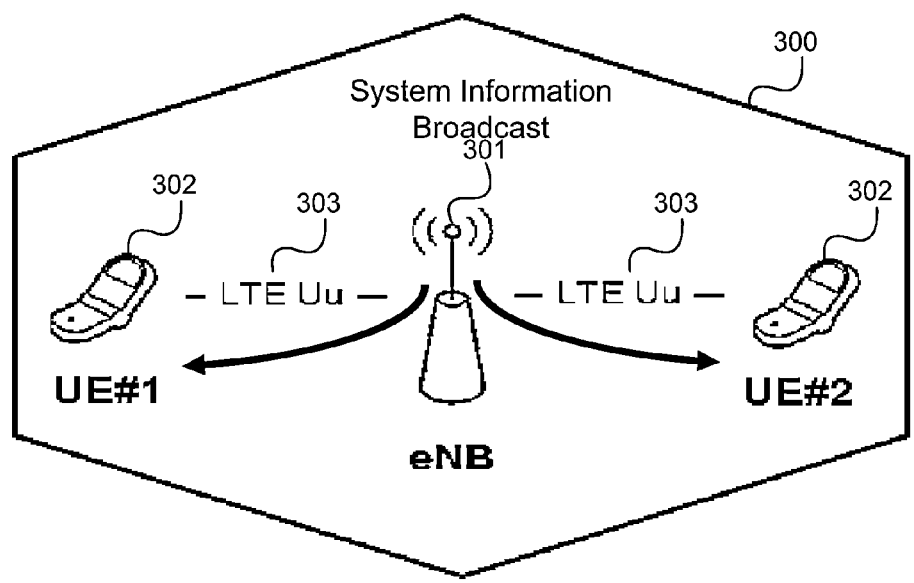
FIG. 3 shows a mobile radio cell according to an embodiment.

FIG. 3 shows a mobile radio cell 300 according to an embodiment.

The mobile radio cell 300 for example corresponds to a mobile radio cell 104 and is operated by a base station 301 for example corresponding to one of the base stations 103. Mobile terminals 302 are located in the mobile radio cell 300 and receive information from the base station 301 via broadcast over air interface 303 (e.g. the LTE Uu interface in case of LTE).

For example, in case of LTE, all mobile terminals 302 in RRC_IDLE located in the mobile radio cell 300 receive the same pieces of broadcast information. Unlike for mobile terminals in RRC_CONNECTED there is no dedicated signaling for mobile terminals 302 in RRC_IDLE state.

As mentioned above a mobile terminal 105 in RRC_IDLE is responsible for its own mobility. It performs Radio Link Performance Measurements (RLPM) (or reception quality measurements) on the serving mobile radio cell, and (usually if the results of these measurements are below certain thresholds) on neighbouring mobile radio cells 104 (i.e. in mobile radio cells 104 neighbouring the one on which it is camping) in order to find mobile radio cells 104 better suited for communication with the radio access network 101. Measurements on a mobile radio cell pertaining to radio link performance (also referred to as "Radio Link Performance Measurements" (RLPM) herein) may (e.g., in case of LTE) include the measuring of Reference Signal Received Power (RSRP) and/or Reference Signal Received Quality (RSRQ) that are both based on downlink reference signals transmitted by a base station 103 for the operation of this mobile radio cell 104, i.e. may generally include the measuring of a reception power or a reception quality of signals, e.g. reference signals, transmitted by the base station 103 and received by the mobile terminal 105 via a radio link between the base station 103 and the mobile terminal 105. For example, according to LTE, E-UTRAN 101 may configure mobile terminals 105 to perform RLPM by transmitting a NCL (Neighbour Cell List) to the mobile terminals 105 in broadcast mode. For example, according to LTE, both Reference Signal Received Power (RSRP) and Reference Signal Received Quality (RSRQ) are defined in 3GPP TS 36.214.

The NCL is a part of the mobile communication system's 100 System Information (SI) and is described in more detail in the following.

According to one embodiment, the Information Element (IE) of the System Information SystemInformationBlockType3 contains cell re-selection information common for intra-frequency, inter-frequency and/or inter-RAT cell re-selection (i.e. applicable for more than one type of cell re-selection but not necessarily all) as well as intra-frequency cell re-selection information other than neighbouring cell related. Examples for these pieces of information are various thresholds and timers for instance to configure hysteresis, or the maximum bandwidth for measurements, and alike.

The Information Element SystemInformationBlockType4 contains neighbouring cell related information relevant only for intra-frequency cell re-selection. It includes cells with specific re-selection parameters as well as blacklisted cells.

SystemInformationBlockType4 for example includes
   intraFreqNeighbCellList:
      List of intra-frequency neighboring cells with specific cell re-selection parameters The IE SystemInformationBlockType5 contains information relevant only for inter-frequency cell re-selection i.e. information about other E UTRA frequencies and inter-frequency neighbouring cells relevant for cell re-selection. The IE includes cell re-selection parameters common for a frequency as well as cell specific re-selection parameters. SystemInformationBlockType4 for example includes
   interFreqNeighCellList:
      List of inter-frequency neighboring cells with specific cell re-selection parameters The IE SystemInformationBlockType6 contains information relevant only for inter-RAT cell re-selection i.e. information about UTRA frequencies and UTRA neighbouring cells relevant for cell re-selection. The IE includes cell re-selection parameters common for a frequency. SystemInformationBlockType6 for example includes
   carrierFreqListUTRA-FDD:
      List of carrier frequencies of UTRA FDD
   carrierFreqListUTRA-TDD:
      List of carrier frequencies of UTRA TDD The IE SystemInformationBlockType7 contains information relevant only for inter-RAT cell re-selection i.e. information about GERAN frequencies relevant for cell re-selection. The IE includes cell re-selection parameters for each frequency, e.g.
   carrierFreqsInfoList:
      List of neighboring GERAN carrier frequencies, which may be monitored for neighboring GERAN cells. The GERAN carrier frequencies are organized in groups and the cell reselection parameters are provided per group of GERAN carrier frequencies.

According to one embodiment, instead of a mobile terminal 105 in RRC_IDLE performing measurements on all mobile radio cells 104 that are listed in the NCL received as part of the system information (SI) in broadcast mode, it may be taken into account that a large subset of this NCL may not applicable for a particular mobile terminal 105 because of its current geographical location, movement speed and/or heading.

Figure 4:
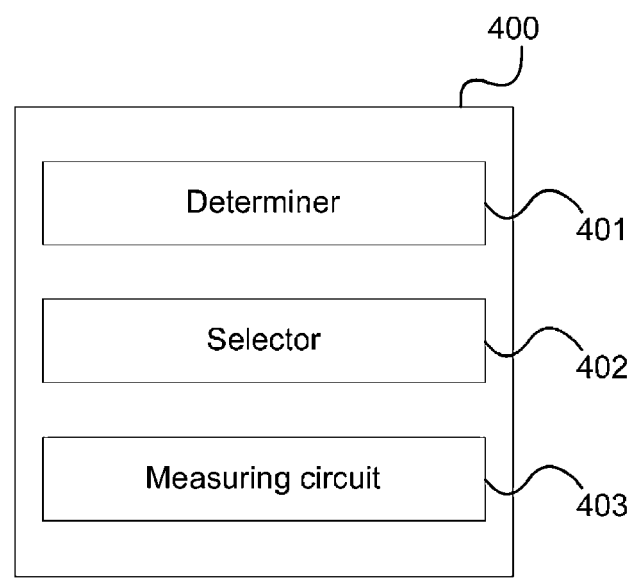
FIG. 4 shows a communication device according to an embodiment.

A mobile communication device (e.g. a mobile terminal) according to an embodiment is illustrated in FIG. 4.

FIG. 4 shows a communication device 400 according to an embodiment.

The mobile communication device 400 includes a determiner 401 configured to determine at least one of a geographical position of the mobile communication device 400 within a first mobile radio cell in which the mobile communication device 400 is located and a movement direction of the mobile communication device 400.

The mobile communication device 400 further includes a selector 402 configured to select, based on at least one of the determined geographical position and the determined movement direction, from a plurality of second mobile radio cells at least one second mobile radio cell for a radio link performance measurement (RLPM).

Further, the mobile communication device 400 includes a measuring circuit 403 configured to measure the performance of the radio link between the mobile communication device and a base station operating the at least one selected second mobile radio cell.

It should be noted that selecting at least one second mobile radio cell means one or more but not all of the plurality of the plurality of second mobile radio cells. The selector 402 is for example implemented as a selecting circuit and/or the determiner 401 is for example implemented as a determining circuit.

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

According to one embodiment, the second mobile radio cells are neighboring or (partially) overlapping with the first mobile radio cell.

The communication device may further include a memory storing a list including the plurality of second mobile radio cells.

The communication device may further include a receiver configured to receive an indication of the plurality of second mobile radio cells;

According to one embodiment, the selector is configured to select the at least one second mobile radio cell based on at least one of the determined geographical position and the determined movement direction and based on the relative geographical position of the second mobile radio cell with respect to the first mobile radio cell.

The communication device may further include a receiver configured to receive an information about the relative geographical position of the second mobile radio cells with respect to the first mobile radio cell.

According to one embodiment, the selector is configured to select a mobile radio cell of the second mobile radio cells if according to the movement direction of the mobile communication device the distance of the mobile communication device to the coverage area of the mobile radio cell is becoming smaller.

According to one embodiment, the selector is configured to select a subset of the second mobile radio cells for a radio link performance measurement (RLPM) and to not select another subset of the second mobile radio cells for a radio link performance measurement (RLPM) such that each second mobile radio cell of the selected subset is closer to the mobile communication device than any mobile radio cell of the other subset.

According to one embodiment, the selector is configured to select a mobile radio cells of the second mobile radio cells if the distance of the mobile communication device to the second mobile radio cell is below a pre-determined threshold and to not select the mobile radio cell if the distance of the mobile communication device to the second mobile radio cell is above the pre-determined threshold.

The selector may be configured to select the at least one mobile radio cell based on a combination of the geographical position within the first mobile radio cell and the movement direction.

According to one embodiment, the determiner is further configured to determine a movement speed of the mobile communication device and the selector is configured to select the at least one second mobile radio cell based on the movement speed of the mobile communication device.

According to one embodiment, the determiner is configured to determine at least one of the geographical position, the movement direction, and the movement speed of the mobile communication device using a satellite positioning system, e.g. GPS.

The measuring circuit may be configured to measure the performance of a radio link between the base station and the mobile communication device by measuring the reception quality of signals, e.g. of reference signals which the base station sends for operating the at least one selected second mobile radio cell.

According to one embodiment, the selector is configured to select, based on at least one of the determined geographical position and the determined movement direction, from the plurality of second mobile radio cells at least one second mobile radio cell for a radio link performance measurement (RLPM) with a first priority and at least one other second mobile radio cell for a radio link performance measurement (RLPM) with a second priority and wherein the measuring circuit is configured to measure the performance of a radio link between the mobile communication device and a base station operating the at least one selected second mobile radio cell according to the first priority and to measure the performance of a radio link between the mobile communication device and a base station operating the at least one selected other second mobile radio cell according to the second priority.

For example, measuring the radio link performance according to the first priority involves at least one of performing a higher number of measurements and performing more accurate measurements (e.g. of the reception quality of signals) than measuring the radio link performance according to the second priority.

The communication device may further include a mobile radio cell selector configured to select a mobile radio cell for the communication device to camp on based on the measurements.

Figure 5:
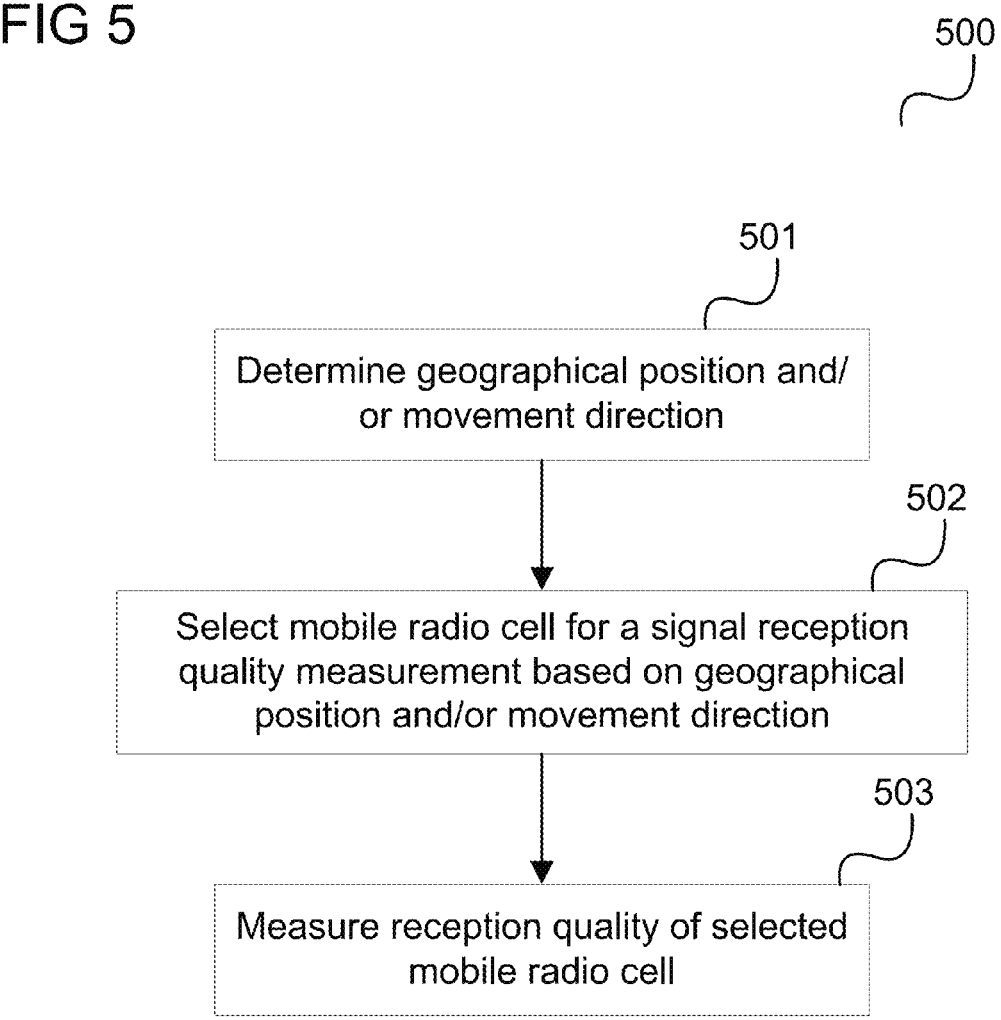
FIG. 5 shows a flow diagram according to an embodiment.

The communication device 400 for example carries out a method as illustrated in FIG. 5.

FIG. 5 shows a flow diagram 500 according to an embodiment.

The flow diagram 500 illustrates a method for performing radio link performance measurements (RLPM).

In 501, a communication device determines at least one of a geographical position of the mobile communication device within a first mobile radio cell in which the mobile communication device is located and a movement direction of the mobile communication device.

In 502, the communication device selects, based on at least one of the determined geographical position and the determined movement direction, from a plurality of second mobile radio cells at least one second mobile radio cell for a radio link performance measurement.

In 503, the communication device measures the performance of a radio link between the mobile communication device and a base station operating the at least one selected second mobile radio cell.

It should be noted that embodiments described in context of the communication device are analogously valid for the method for performing radio link performance measurements (RLPM) and vice versa.

In one embodiment, in other words, geographical information such as position and movement speed and/or movement direction is taken into account for determining the mobile radio cells for which radio link performance measurements (RLPM) (e.g. reception quality measurements) are to be carried out. It should be noted that the geographical position may include longitude and latitude but also height, e.g. above sea level. For examples, mobile radio cells that are assigned to be measured (e.g. are included in a list of mobile radio cells to be measured, e.g. signaled by the radio access network) are omitted by the communication device based on the geographical information and for example based on a pre-determined criterion, for example since it is unlikely, based on the geographical information, that the communication device is going to enter the coverage area of these mobile radio cells.

Figure 6:
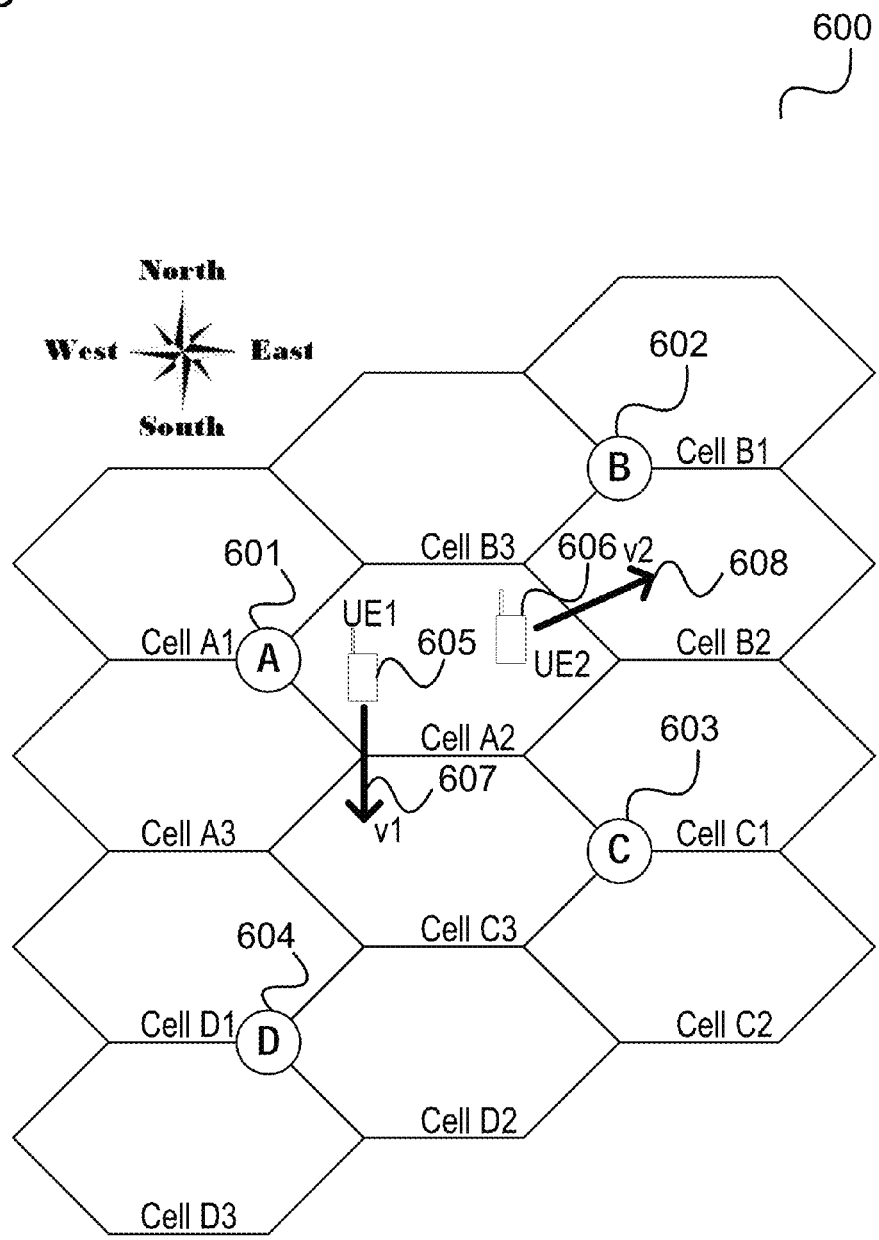
FIG. 6 shows a mobile radio cell arrangement according to an embodiment.

This is illustrated in FIG. 6.

FIG. 6 shows a mobile radio cell arrangement 600 according to an embodiment.

The mobile radio cell arrangement 600 includes three mobile radio cells denoted A1, A2, A3 operated by a first base station 601 (base station "A"), three mobile radio cells denoted B1, B2, B3 operated by a second base station 602 (base station "B"), three mobile radio cells denoted C1, C2, C3 operated by a third base station 603 (base station "C"), and three mobile radio cells denoted D1, D2, D3 operated by a fourth base station 604 (base station "D").

It is assumed that the mobile radio cells have a roughly hexagonal structure. This is an idealisation and in real scenarios the network topology may look different (there will be non-hexagonal cells, overlaps areas and areas with lack of coverage).

A first mobile terminal 605 and a second mobile terminal 606 are in RRC_IDLE state and are camping on mobile radio cell A2 which is served by the first base station 601. Consequently, for cell re-selection purposes the mobile terminals 605, 606 listen to the System Information (SI) that is broadcast in the mobile radio cell A2. Both mobile terminals 605, 606 receive NCL details about all surrounding mobile cells while camping on mobile radio cell A2, i.e. all mobile radio cells neighbouring mobile radio cell A2, namely mobile radio cells B3, B2, C1, C3, A3, and A1.

According to one embodiment, instead of processing all these NCL details and performing radio link performance measurement (RLPM) (e.g. reception quality measurements) on a total number of (in this example) six surrounding mobile radio cells in order to find the best candidate for cell re-selection, the individual current or predicted location, movement speed and movement heading of the mobile terminals 605, 606 is taken into account and a subset of these mobile radio cells is determined for which radio link performance measurement (RLPM) are carried out. For example, a radio link performance measurement (RLPM) is not carried out for a mobile radio cell that will most likely not be chosen to camp on, e.g. because the distance to the mobile radio cell cells is too big. If a mobile terminal 605, 606 is moving away from such mobile radio cells the distance may even be growing.

A first arrow 607 indicates the movement direction of the first mobile terminal 605 and a second arrow 608 indicates the movement direction of the second mobile terminal 606. In this example the first mobile terminal 605 is moving southwards (approaching mobile radio cell A3 and mobile radio cell C3) and the second mobile terminal 606 has a North-East heading (approaching mobile radio cell B2).

Doing radio link performance measurements (RLPM) on only a sub set of cells listed in the NCL may speed up the cell re-selection process, free processing resources of the mobile terminals 605, 606 and save battery power of the mobile terminals 605, 606. Thus, according to one embodiment, each mobile terminal 605, 606 restricts radio link performance measurements (RLPM) to those mobile radio cells that have a realistic chance to be chosen by the mobile terminal 605, 606 for camping on.

In the example shown in FIG. 6, it may for instance not make much sense for the first mobile terminal 605 to measure the radio link performance of mobile radio cell A1, mobile radio cell B3, mobile radio cell B2, and mobile radio cell C1 when it is moving with a southern heading away from its current location. Only cells located south of its current position, such as mobile radio cell C3 and mobile radio cell A3 are realistic candidates to camp on and may therefore be of interest for the first mobile terminal 605 to perform radio link performance measurements upon.

It should be noted that a black list for mobile radio cells may also be conveyed as part of System Information (SI) broadcast from E-UTRAN 101 to all mobile terminals 105 within the coverage area. However, the information in the neighbour cell black list is applicable for all mobile terminals in coverage of the corresponding cell and a neighbour cell black list may block out certain cells, but still a large number of neighbouring cells remain for which it may be beneficial that the mobile terminals take into account their individual location and/or speed and/or heading for deciding whether radio link performance measurements (RLPM) should be performed on these mobile radio cells.

It should further be noted that a selection as in the above embodiments can also be applied to filtering such a black list (i.e. a mobile terminal may be enabled to pick a subset of mobile radio cells from a received blacklist). This may be beneficial in some scenarios, as the process of compiling a resulting list of mobile radio cells that the mobile terminal is supposed to perform measurements upon can further be simplified.

According to one embodiment, usage is made of the fact that more and more mobile terminals (such as cell phones) are equipped with GPS (Global Positioning System) receivers and similar positioning techniques these days. As a consequence mobile terminals today have a high degree of self awareness with respect to their current geographical location and/or movement speed and/or movement heading. Accuracy and reliability of these positioning techniques are improved continuously. Moving mobile terminals can also predict their future geographical location and/or geographical speed and/or geographical heading to a certain extent.

According to an embodiment, positioning data may be given using the following information.

Latitude (abbreviation: Lat., ϕ, or phi) is the angle between the equatorial plane and a line that is normal to the reference ellipsoid, which approximates the shape of earth to account for flattening of the poles and bulging of the equator. Lines joining points of the same latitude are called parallels, which trace concentric circles on the surface of the Earth, parallel to the equator. The north pole is 90° N; the south pole is 90° S. The 0° parallel of latitude is designated the equator, the fundamental plane of all geographic coordinate systems. The equator divides the globe into Northern and Southern Hemispheres.

Longitude (abbreviation: Long., λ, or lambda) is the angle east or west of a reference meridian between the two geographical poles to another meridian that passes through an arbitrary point. All meridians are halves of great circles, and are not parallel. They converge at the north and south poles. A line passing to the rear of the Royal Observatory, Greenwich (near London in the UK) has been chosen as the international zero-longitude reference line, the Prime Meridian. Places to the east are in the eastern hemisphere, and places to the west are in the western hemisphere. The antipodal meridian of Greenwich is both 180° W and 180° E.

An example location can be expressed in two different ways as follows

|  | Latitude | Longitude |
| --- | --- | --- |
| Decimal | 52.264667 North | 10.523776 East |
| deg-min-sec | 52° 15' 52.80" North | 10° 31' 25.59" East |

In the upper format a pair of decimal values is shown (one for latitude and one for longitude), while in the lower format a triple consisting of degree, minute and second represents the values for latitude and longitude, respectively. Both data formats can be easily translated into another.

It should be noted that although height is relative to a plane of reference, most measurements of height in the physical world are based upon a zero surface, known as sea level. Both altitude and elevation, two synonyms for height, may be defined as the position of a point above the mean sea level.

In kinematics, the instantaneous speed of an object (denoted v) is the magnitude of its instantaneous velocity (the rate of change of its position); it is thus the scalar equivalent of velocity. The average speed of an object in an interval of time is the distance traveled by the object divided by the duration of the interval; the instantaneous speed is the limit of the average speed as the duration of the time interval approaches zero. Like velocity, speed has the dimensions of a length divided by a time; the SI unit of speed is the meter per second, but the most usual unit of speed in everyday usage is the kilometer per hour (kmph) or, in the USA and the UK, miles per hour (mph).

Heading is the direction a person or vehicle is facing, usually similar to its course. Velocity describes the rate of change of position and is a vector physical quantity; both magnitude and direction are required to define it. The scalar absolute value (magnitude) of velocity is speed, a quantity that is measured in meters per second (m/s or ms-1) when using the SI (metric) system.

According to one embodiment, mobile terminals, e.g. the two mobile terminals 605, 606 of FIG. 6, are each associated with a set of positioning information, for example including location, speed, heading etc. Velocity may for example be included as a pair of data consisting of speed and heading. Although the mobile terminals 605, 606 are served by the same base station 601 they may for example not be in very close vicinity to one another and their velocity parameters may also differ in this example as follows:

Positioning Set of first mobile terminal 605:
Location: lat=52.264667 N/long=10.523776 E
Speed: 5 kmph
Heading: South
Positioning Set of second mobile terminal 606:
Location: lat=52.265102 N/long=10.524125 E
Speed: 4 kmph
Heading: NorthEast The Positioning Set may also include height or altitude information, e.g. in meters above sea level.

In one embodiment, the positioning capabilities and location awareness of a mobile terminal are exploited for reducing the number of mobile radio cells on which it performs radio link performance measurements (RLPM) for cell re-selection purposes (in RRC_IDLE), i.e. for selecting a new mobile radio cell to camp on. Compared to measuring all neighbouring mobile radio cells this may allow finding a suitable mobile radio cell to camp on is found faster, may reduce the number of consecutive cell re-selections, may free processing resources in the mobile terminal for other calculations and may save battery power of the mobile terminal.

According to one embodiment, mobile radio cells listed in the NCL (Neighbour Cell List) of a mobile radio cell are clustered based on their relative location to the mobile radio cell. For example, when considering mobile radio cell A2 of the mobile radio cell arrangement shown in FIG. 6, the neighbouring mobile radio cells A1, B3, and B2 are located north of the center of the mobile radio cell A2, while the neighbouring mobile radio cells C1, C3, and A3 are located south of it. In this case, for example a NCL is structured according to one embodiment such that it includes two clusters of mobile radio cells, one for the cells located north of (the centre of) mobile radio cell A2 and one for cells located south of (the centre of) mobile radio cell A2.

By indicating these two clusters of neighbouring mobile radio cells to the mobile terminals 605, 606, e.g. via System Information (SI) broadcast, the two mobile terminals 605, 606 moving through mobile radio cell A2 are enabled to use their awareness with respect to their individual location and/or movement speed and/or movement heading in order to reduce the number of neighbouring mobile radio cells to perform measurements on. For example mobile radio cells that do not have a realistic chance to be chosen by a mobile terminal 605, 606 to camp on can simply be left out in the measuring process.

Figure 7:
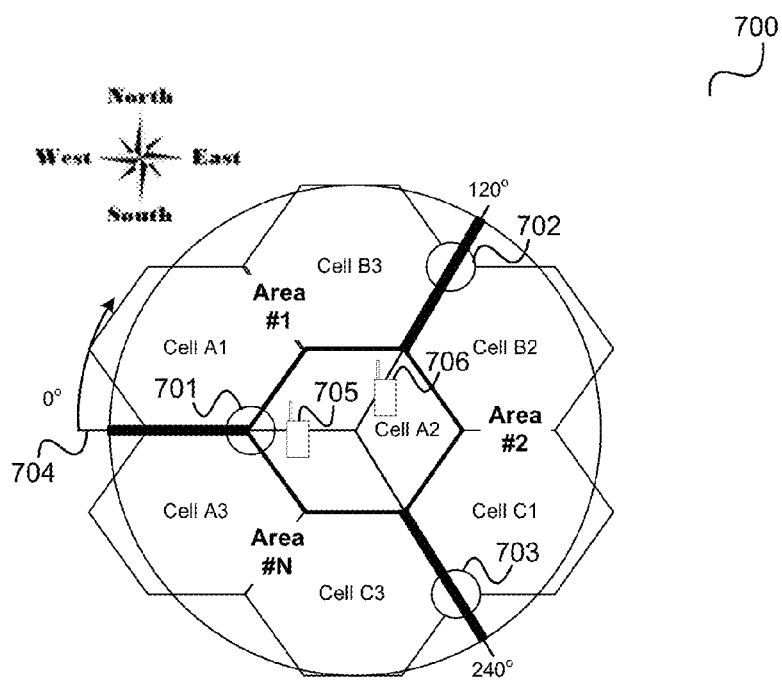
FIG. 7 shows a mobile radio cell arrangement according to an embodiment.

An example for a clustering according to one embodiment is illustrated in FIG. 7.

FIG. 7 shows a mobile radio cell arrangement 700 according to an embodiment.

The mobile radio cell arrangement 700 corresponds to a part of the mobile radio cell arrangement 600 shown in FIG. 6 and includes mobile radio cells A1, A2, A3 operated by a first base station 701 (base station "A"), mobile radio cells B2, B3 operated by a second base station 702 (base station "B"), and mobile radio cells C1, C3 operated by a third base station 703 (base station "C"), i.e. mobile radio cell A2 and its neighboring mobile radio cells.

The neighbour cells for mobile terminals 705, 706 camping on mobile radio cell A2 (which is the current mobile radio cell for the mobile terminals 705, 706) are segmented into three parts (N=3) as follows:

Cluster "Area #1" (in North-Western direction) consists of mobile radio cell A1 and mobile radio cell B3;
Cluster "Area #2" (in Eastern direction) consists of mobile radio cell B2 and mobile radio cell C1;
Cluster "Area #3" (in South-Western direction) consists of mobile radio cell A3 and mobile radio cell C3.

In addition, a common starting point (e.g., '0' degrees meaning West) or starting direction 704 is defined. The starting point 704 and the number of clusters (parameter N) are made available to the mobile terminals 705, 706. This can be done via System Information (SI) broadcast or per definition in advance.

It may be beneficial to keep the starting point 704 (in this example West) and the parameter N (in this example N=3) constant for a certain amount of time. However, according to one embodiment, a dynamic approach is used in which the starting point 704 and the parameter N are adjusted from time to time during operation of the communication system. For this, transmission of the data via the cellular communication system's System Information (SI) broadcast can be used to signal a change of these parameters.

The same starting point and/or the same value for parameter N may be assigned to multiple mobile radio cells (for instance mobile radio cells forming a certain group, or mobile radio cells of a given tracking area or all mobile radio cells of the PLMN). However, not all mobile radio cells in a PLMN necessarily have to have the same value for starting point and/or parameter N.

Depending on the network topology and number of surrounding mobile radio cells different values for both the starting point and the parameter N may be assigned to different mobile radio cells, even if they are adjacent.

As explained above, the Information Element (IE) SystemInformationBlockType4 contains neighbouring mobile radio cell related information relevant only for intra-frequency cell re-selection. The Information Element includes mobile radio cells with specific re-selection parameters (such as physCellId and q-OffsetCell) and may additionally include blacklisted mobile radio cells.

A modified IE SystemInformationBlockType4 according to one embodiment (without blacklisted cells) may for example have the following structure:

```
-- ASN1START
SystemInformationBlockType4 ::=          SEQUENCE {
    N                         INTEGER (1..8)                              OPTIONAL,
    StartingPoint             ENUMERATED {West, North, East, South}        OPTIONAL,
    AreaSubset ::= SEQUENCE (size (1..N)) OF IntraFreqNeighCellList
    ...
}
IntraFreqNeighCellList ::=        SEQUENCE (SIZE (1..(maxCellPerArea)) OF
                                  IntraFreqNeighCellInfo
IntraFreqNeighCellInfo ::=        SEQUENCE {
    physCellId                                  PhysCellId,
    q-OffsetCell                                Q-OffsetRange,
    ...
}
-- ASN1STOP
```

According to this structure, there is a new IE StartingPoint with four possible values corresponding to the starting point 704 of FIG. 7. A finer granularity may be allowed if desired, for example eight possible starting directions. The number of starting directions may be chosen depending on the topology of the mobile communication network (e.g. the geographical arrangement of the mobile radio cells). The IE StartingPoint is marking the beginning of the angle measurement (i.e., 0°) for the mobile terminals 705, 706. There is also a new Information Elemented denoted N corresponding to the parameter N. It is specified in this example as an integer variable with a maximum value of eight. That means that the neighborhood of the mobile radio cell A2 can be divided into up to eight circle sectors of 360/8=45 degrees.

In the example illustrated in FIG. 7 N equals three, so there are three segments (i.e. circle sectors) of 120° each. According to these segments or areas, the neighbouring mobile radio cells are clustered. There is an IE AreaSubset containing a neighboring cell sub-list for each segment including a certain number of neighbouring cells (up to a number of maxCellPerArea) belonging to this segment (and the corresponding cluster).

The number of blacklisted cells can be restricted in a similar manner (if needed). For this, the IE SystemInformationBlockType4 can have the following structure:

The value of the IE CellsPerArea can be different for each cell cluster. In this example, it may have a maximum value of 16. It should be noted that blacklisted mobile radio cells are not included in the above structure for simplicity.

In the above examples it is shown how the existing Information Element (IE) SystemInformationBlockType4 can be modified. This IE is relevant only for intra-frequency cell

```
-- ASN1START
SystemInformationBlockType4 ::=    SEQUENCE {
    N                      INTEGER (1.. 8)                        OPTIONAL,
    StartingPoint          ENUMERATED {West, North, East, South}  OPTIONAL,
    AreaSubset ::=         SEQUENCE (size (1..N)) OF ClusterInfo
    ClusterInfo ::=        SEQUENCE {
        intraFreqNeighCellList      IntraFreqNeighCellList         OPTIONAL,
        intraFreqBlackCellList      IntraFreqBlackCellList         OPTIONAL
    }
}
IntraFreqNeighCellList ::=      SEQUENCE (SIZE (1..(maxCellPerArea)) OF
                                IntraFreqNeighCellInfo
IntraFreqNeighCellInfo ::=      SEQUENCE {
    physCellId                              PhysCellId,
    q-Offset                                Q-OffsetRange,
    ...
}
IntraFreqBlackCellList::=       SEQUENCE (SIZE (1..maxCellBlackPerArea)) OF
                                PhysCellIdRange
-- ASN1STOP
```

A total number of maxCellBlackPerArea mobile radio cells can be excluded for a given segment from the measurements according to this structure.

In the two example structures for the IE SystemInformationBlockType4 above the number of mobile radio cells per area (corresponding to a segment) is the same for all areas. Depending on the actual network topology this may not be optimal in all cases, since there may be a direction in which more mobile radio cells can be found by a mobile terminal than in other directions (for example when a mobile terminal is moving from a sparsely populated rural area into a densely populated urban area).

A base (transceiver) station (e.g. eNodeBs, eNBs, according to LTE) may know the distribution of neighbouring cells relative to the centre of its own cell when it compiles the NCL for system information (SI) broadcast. According to one embodiment, a different number of mobile radio cells per area may be allowed for each of the N different areas. For this, according to one embodiment, the parameter CellsPerArea is used. For example, the IE SystemInformationBlockType4 may have the following structure in this case:

re-selection. The other IEs for inter-frequency cell re-selection and inter-RAT cell re-selection can be modified accordingly.

From the point of view of a mobile terminal, all mobile radio cells of any given cluster lie in exactly the same direction. For the mobile terminals 705, 706 camping on mobile radio cell A2 and moving in Eastern direction the most relevant cluster of mobile radio cells (in terms of the probability that a mobile radio cell of the cluster is selected for camping) is the cluster of area #2 including mobile radio cell B2 and mobile radio cell C1.

This approximation may be ok for a camping mobile terminal 705, 706 residing in the left (western) part of mobile radio cell A2 or in the centre of mobile radio cell A2, but it may not serve well for a mobile radio terminal 705, 706 residing in the extreme right part of mobile radio cell A2. Therefore, according to one embodiment, an even finer granularity may be used. For this, for example, in the list of neighbouring cells of a cluster (for a given area) the mobile radio cell listed in the first position of the list is the closest cell to the left border of the respective cluster, and the cell listed in the last position of the list is the one being closest to the right

```
-- ASN1START
SystemInformationBlockType4 ::=            SEQUENCE {
    N                      INTEGER (1..8)
    CellsPerArea           INTEGER (1..16)
    StartingPoint          ENUMERATED {West, North, East, South}   OPTIONAL,
    AreaSubset ::= SEQUENCE (size (1..N)) OF IntraFreqNeighCellList
    ...
}
IntraFreqNeighCellList ::=      SEQUENCE (SIZE (1..(CellsPerArea)) OF
                                IntraFreqNeighCellInfo
IntraFreqNeighCellInfo ::=      SEQUENCE {
    physCellId                              PhysCellId,
    q-OffsetCell                            Q-OffsetRange,
    ...
}
-- ASN1STOP
``` border of the respective cluster. In the example of FIG. 7 this means: Mobile radio cell B2 is listed first in the cluster list belonging to Area #2, while mobile radio cell C1 is listed last in the same cluster list. In other words, the mobile radio cells may be listed in the system information in an ordering that allows the mobile terminal to determine the relative position of the mobile radio cells with respect to the current mobile radio cell or at least the relative position of the mobile radio cells within the various clusters of mobile radio cells defined in the system information.

Figure 8:
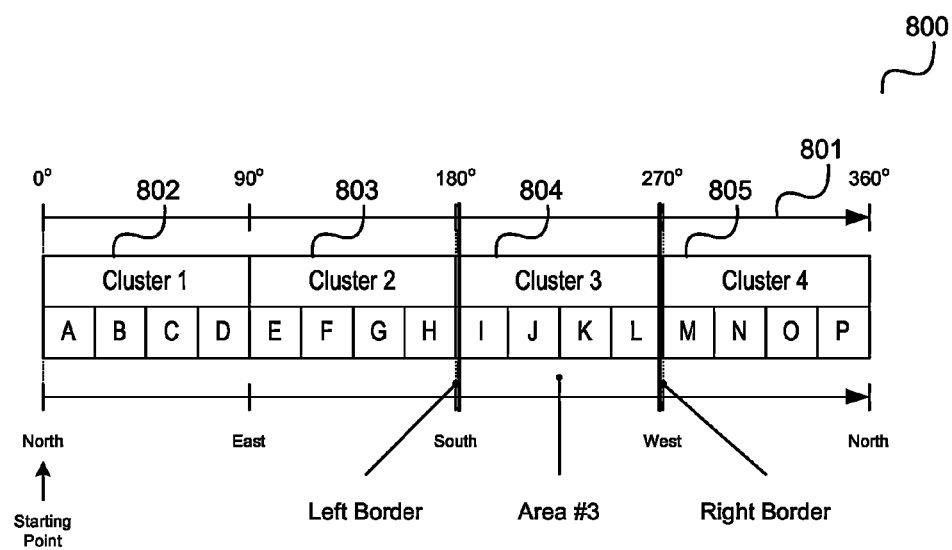
FIG. 8 shows direction diagram according to an embodiment.

A further example of the clustering of mobile radio cells is illustrated in FIG. 8.

FIG. 8 shows direction diagram 800 according to an embodiment.

The position of mobile radio cells with respect to a current mobile radio cell is illustrated by the direction diagram 800. The starting point (or starting direction) is in this example Northern direction. Other directions are given by angles from 0° (Northern direction) to 360° along a direction axis 801. In this example, there are four clusters 802 to 805 numbered 1 to 4, wherein each cluster includes four mobile radio cells such that there is a total of neighbouring mobile radio cells of 16 denoted by A to P.

If a mobile terminal detects from its positioning capabilities that it is moving towards cluster number 3 (which is in South-Western direction in this example), it may for example neglect measuring on the subset of the set of neighbouring mobile radio cells that includes the mobile radio cells in cluster number 1, that means on mobile radio cells A to D.

Furthermore, the mobile radio cells listed in the neighbouring cell sub-lists for cluster 2 and cluster 4 in the system information are highly unlikely candidates for cell re-selection. It this example, what may be of primary interest for the mobile terminal approaching the area corresponding to cluster number 3 is the sub-list for cluster 3 including mobile radio cells I through L.

It should be noted that the selection of mobile radio cells for radio link performance measurement (RLPM) may also include the evaluation of height information. If for example, radio cells are arranged at various altitudes (e.g. Home Base Stations or femto cells, such as Home eNBs, located in various floors of a building), the mobile terminal may for example select mobile radio cells for measurement that are above its current position in case it is moving upwards (e.g. carried by a user in an elevator or staircase).

According to one embodiment, the order of cells per cluster is defined as follows: the cell listed in the first position the sublist for cluster 3 (here: mobile radio cell I) is closest to the border between cluster 2 and cluster 3 (in this example this is the left border of the area corresponding to cluster 3 from the point of view of the current mobile radio cell and is given by the southern direction). This means that mobile radio cell I is adjacent to mobile radio cell H. The mobile radio cell listed in the last position of the sub-list for cluster 3 (here: mobile radio cell L) is closest to the border between cluster 3 and cluster 4 (in this example this is the right border of the area corresponding to cluster 3 from the point of view of the current mobile radio cell and is given by the western direction), i.e. mobile radio cell L is adjacent to mobile radio cell M. In this example, this means that the mobile radio cells are listed in the sub-lists for the clusters in alphabetical order (of their denotations).

Arranging the mobile radio cells in the neighbouring cell sub-lists according to their relative position to the current mobile radio cell allows an even finer granularity for a location-aware mobile terminal to reduce the set of relevant neighbouring cells for cell re-selection measurements, especially when the mobile terminal is located in close vicinity of any of the borders, since it has more detailed information about the position of the neighbouring mobile radio cells and thus, based on its own position and/or movement direction and/or movement speed, more detailed information about the likeliness that the mobile radio cells are selected as new mobile radio cell to camp on.

Clustering mobile radio cells according to their relative position allows a very fine granularity but may also require a modification of the system information (SI) of the communication system, in particular it requires some new algorithms for compiling a NCL for broadcast as part of the system information (SI). This may require some standardization effort.

Therefore, in one embodiment, a standardization free variant may be used that does not require modifications to conventional system information. In this embodiment, there is no clustering of radio cells and correspondingly no clustering of neighbouring cell list entries in direction specific sublists. Instead, simply per definition the starting point for angle measurements is set, for example, to the northern direction. The remaining cells follow in clock-wise order (around the current mobile radio cell) in the neighbouring cell list (NCL) transmitted in the system information. This is illustrated in FIG. 9

Figure 9:
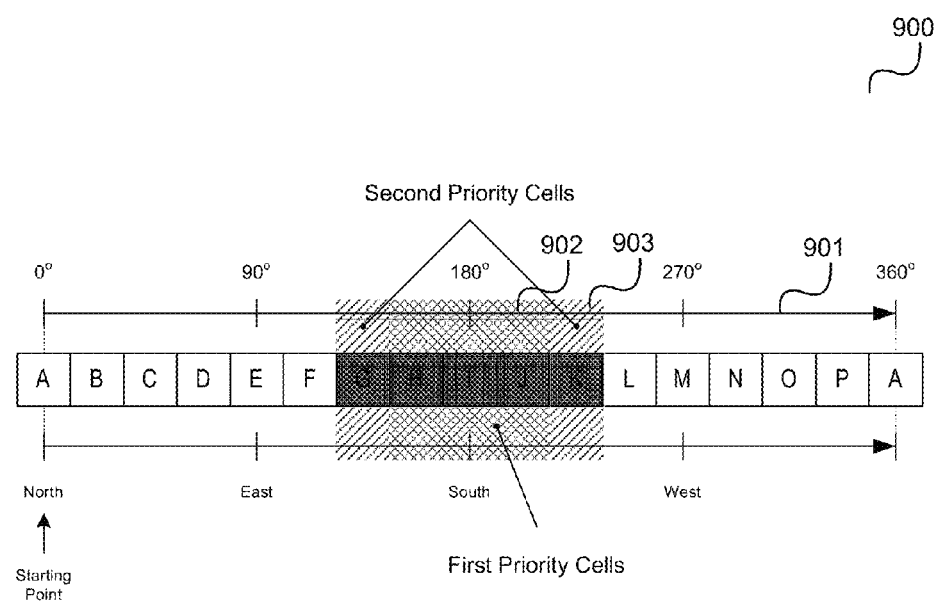
FIG. 9 shows direction diagram according to an embodiment.

FIG. 9 shows direction diagram 900 according to an embodiment.

The position of mobile radio cells with respect to a current mobile radio cell is illustrated by the direction diagram 900. As mentioned, the starting point (or starting direction) is in this example Northern direction per default. Other directions are given by angles from 0° (Northern direction) to 360° along a direction axis 901.

In this example, similar as in the scenario according to FIG. 8, there are 16 mobile radio cells denoted by A to P.

In the neighboring cell list (NCL) contained in the system information (SI), the mobile radio terminals are listed in clockwise order, i.e., in this example in alphabetical order.

Further, per definition (or per default) the mobile radio cell in the middle position of the neighboring cell list (mobile radio cell I in this example) is the mobile radio cell in southern direction of the current mobile radio cell.

A mobile radio terminal moving southward and having knowledge of its own heading, and the fact that the mobile radio cell in first position in the neighboring cell list is in north direction and the mobile radio cell in the middle position in the neighboring cell list is in south direction may for example choose the cells H through J as most likely candidates for cell re-selection (e.g. as first priority cells for the measurement). For example, the mobile terminal does radio link performance measurements (RLPM) on these mobile radio cells (indicated by a first hatching 902 in FIG. 9) with priority (e.g. these mobile radio cells are measured more often and/or more thoroughly).

Additionally, the mobile terminal may treat neighbouring mobile radio cells G and K (indicated by a second hatching 903 FIG. 9) with a lower priority (e.g. doing measurements less often and/or with less accuracy for these mobile radio cells than for mobile radio cells H through J).

In the following, a process flow according to an embodiment is described with reference to FIG. 10.

FIG. 10 shows a flow diagram 1000 according to an embodiment.

In 1001, a mobile terminal in RRC_IDLE state detects suitable or acceptable mobile radio cells to camp on.

In 1002, the mobile terminal selects a mobile radio cell to camp on the detected mobile radio cells.

In 1003, the mobile terminal is camping on the selected cell.

In 1004, mobile terminal acquires the system information (SI) broadcast in the cell it is camping on.

In 1005, the mobile terminal determines its Positioning Set (PS), i.e. its set of geographical information, including at least one of the following pieces of information: position, speed, and heading. These pieces of information put the mobile terminal in a state of location awareness.

In 1006, it is checked whether the Positioning Set as changed since its last determination. If one or more components of the mobile terminal's Positioning Set (PS) have altered compared to the previous determination of the Positioning Set, or if the Positioning Set has the first time been determined (e.g. since camping on the current mobile radio cell) the mobile terminal uses the Positioning Set in 1007 to reduce and/or prioritize the number of mobile radio cells indicated as neighbouring cells via the system information (SI) broadcast, i.e. determines a sub set of neighbouring mobile radio cells on which to perform measurements.

If the Positioning Set (PS) has remained more or less the same (e.g. if changes are small and remain below certain thresholds), a new Positioning Set determination (e.g. position and speed calculation) is not needed and the mobile terminal may proceed with the previously determined sub set of mobile radio cells.

In 1008, the mobile terminal only measures on the determined sub set of the neighbouring cells. The cell re-selection process may thus be faster, processing resources in the mobile terminal may be freed for other operations, and battery power may be saved compared to performing measurements for all neighboring mobile radio cells.

If, in 1009, the mobile terminal finds a better suited mobile radio cell (from the reduced set of mobile radio cells, i.e. from those mobile radio cells of the neighboring mobile radio cells for which the mobile terminal has performed measurements) to camp on, it initiates a cell re-selection process in 1010. If a better suited cell is not found in 1009, the mobile terminal just checks in 1011 whether the cellular communication systems's system information (SI) has been updated.

If the system information has been updated, the mobile terminal continues with 1004 and reads the updated system information (SI) or directly proceeds with 1005 by re-calculating its Positioning Set (PS).

It should be noted that the determination of a mobile terminal's Positioning Set (PS) and detection of System Information (SI) changes can be fully independent from one another. For example, these two processes may even have different periodicities.

The determination of the subset of neighboring mobile radio cells may include, in 1012, the calculation of a starting direction and a measurement angle, e.g. an angle at which neighboring mobile radio cells are positioned relative to the current mobile radio cell in the direction of which the mobile terminal is moving.

In 1013, the mobile terminal determines a first subset of neighboring mobile radio cells for which measurements are to be carried out with high priority.

In 1014, the mobile terminal determines a second subset of neighboring mobile radio cells for which measurements are to be carried out with lower priority.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile communication device comprising:
   a determiner circuit to determine a geographical position of the mobile communication device within a first mobile radio cell in which the mobile communication device is located and a movement direction of the mobile communication device;
   a selector circuit to, in an idle-mode of the mobile communication device or for cell-reselection for the mobile communication device, select, based on the determined geographical position and the determined movement direction of the mobile communication device and independent of signal strength measurements of second mobile radio cells in a plurality of second mobile radio cells, a subset of the plurality of second mobile radio cells for a radio link performance measurement, wherein the subset of the plurality of second mobile radio cells is less than the plurality of second mobile radio cells and wherein the subset of the plurality of second mobile radio cells are clustered based on their relative location to the mobile communication device; and
   a measuring circuit to perform measurements of the performance of a radio link between the mobile communication device and a base station operating a second mobile radio cell in the subset.

2. The mobile communication device according to claim 1, wherein the second mobile radio cells are neighboring or at least partially overlapping with the first mobile radio cell.

3. The mobile communication device according to claim 1, further comprising a memory to store a list including the plurality of second mobile radio cells.

4. The mobile communication device according to claim 1, further comprising a receiver to receive an indication of the plurality of second mobile radio cells.

5. The mobile communication device according to claim 1, wherein the selector is further to select the subset of the plurality of second mobile radio cells based on the relative geographical position of the subset of the plurality of second mobile radio cells with respect to the first mobile radio cell.

6. The mobile communication device according to claim 1, further comprising a receiver to receive an information about the relative geographical position of the subset of the plurality of second mobile radio cells with respect to the first mobile radio cell.

7. The mobile communication device according to claim 1, wherein the selector is further to select the second mobile radio cell in the subset if, according to the movement direction of the mobile communication device, the distance of the mobile communication device to the coverage area of the second mobile radio cell in the subset is becoming smaller.

8. The mobile communication device according to claim 1, wherein each mobile radio cell of the subset of the plurality of second radio cells has a shorter physical distance from the mobile communication device than any mobile radio cell of the plurality of second radio cells.

9. The mobile communication device according to claim 1, wherein the selector is to select the subset of the plurality of second mobile radio cells if the distance of the mobile communication device to a mobile radio cell in the subset of the plurality of second mobile radio cells is below a pre-determined threshold and to not select the subset of the plurality of second mobile radio cells if the distance of the mobile communication device to the mobile radio cell in the subset of the plurality of second mobile radio cells is above the pre-determined threshold.

10. The mobile communication device according to claim 1, wherein the selector is further to select the subset of the plurality of second mobile radio cells based on a combination of the geographical position within the first mobile radio cell and the movement direction.

11. The mobile communication device according to claim 1, wherein the determiner is further to determine a movement speed of the mobile communication device; and
  the selector is to select the subset of the plurality of second mobile radio cells based on the movement speed of the mobile communication device.

12. The mobile communication device according to claim 11, wherein the determiner is further to determine at least one of the geographical position, the movement direction, and the movement speed of the mobile communication device using a satellite positioning system.

13. The mobile communication device according to claim 1, wherein the measuring circuit is further to perform measurements of the performance of a radio link between the base station and the mobile communication device by measuring a reception quality of signals that the base station sends for operating the second mobile radio cell in the subset.

14. The mobile communication device according to claim 1, wherein the selector is further to select, based on the determined geographical position and the determined movement direction, from the subset of the plurality of second mobile radio cells, at least one second mobile radio cell for a radio link performance measurement with a first priority and at least one other second mobile radio cell for a radio link performance measurement with a second priority; and
  the measuring circuit is further to measure the performance of a radio link between the mobile communication device and a base station operating the at least one selected second mobile radio cell according to the first priority, and to measure the performance of a radio link between the mobile communication device and a base station operating the at least one selected other second mobile radio cell according to the second priority.

15. The mobile communication device according to claim 14, wherein measuring radio link performance according to the first priority involves at least one of performing a higher number of measurements and performing more accurate measurements than measuring the radio link performance according to the second priority.

16. The mobile communication device according to claim 1, further comprising a mobile radio cell selector to select a mobile radio cell for the communication device to camp on based on the measurements.

17. A method for performing radio link performance measurements comprising:
  determining, by a communication device, a geographical position of the mobile communication device within a first mobile radio cell in which the mobile communication device is located and a movement direction of the mobile communication device;
  selecting from a plurality of second mobile radio cells, by the communication device in an idle-mode or cell reselection mode and based on the determined geographical position and the determined movement direction and independent of signal strength measurements of second mobile radio cells in the plurality of second mobile radio cells, a subset of the plurality of second mobile radio cells for a radio link performance measurement, wherein the subset of the plurality of second mobile radio cells are clustered based on their relative location to the mobile communication device; and
  the communication device measuring the performance of a radio link between the mobile communication device and a base station operating selected mobile radio cell in the subset of the plurality of second mobile radio cells.

18. The mobile communication device according to claim 6, wherein the information about the relative geographical position of the second mobile radio cells with respect to the first mobile radio cell comprises a clustering of the second mobile radio cells according to a direction from the first mobile radio cell.

19. The method according to claim 17, further comprising receiving, by the communication device, an information about the relative geographical position of the second mobile radio cells with respect to the first mobile radio cell, wherein the information about the relative geographical position of the second mobile radio cells with respect to the first mobile radio cell comprises a clustering of the second mobile radio cells according to direction from the first mobile radio cell.

20. The mobile communication device according to claim 18, wherein the mobile radio cells of any given cluster lie in the same direction corresponding to the mobile communication device.

21. The mobile communication device according to claim 20, wherein the mobile communication device is to detect that itself is moving in the direction to the most relevant cluster of mobile radio cells, to reduce the number of mobile radio cells to perform measurements on.

* * * * *

UNITED STATES PATENT AND TRADEMARK OFFICE
CERTIFICATE OF CORRECTION

PATENT NO. : 8,913,591 B2  
APPLICATION NO. : 13/017079  
DATED : December 16, 2014  
INVENTOR(S) : Maik Bienas et al.

Page 1 of 1

It is certified that error appears in the above-identified patent and that said Letters Patent is hereby corrected as shown below:

IN THE CLAIMS

Column 20, line 24 (Claim 17, line 21): Replace "operating selected" with --operating a--.

Signed and Sealed this  
Twenty-eighth Day of June, 2016

Michelle K. Lee  
*Director of the United States Patent and Trademark Office*